US010565021B2

(12) United States Patent
Zhou et al.

(10) Patent No.: US 10,565,021 B2
(45) Date of Patent: Feb. 18, 2020

(54) AUTOMATED CAPACITY MANAGEMENT IN DISTRIBUTED COMPUTING SYSTEMS

(71) Applicant: Microsoft Technology Licensing, LLC, Redmond, WA (US)

(72) Inventors: Shandan Zhou, Kenmore, WA (US); Karthikeyan Subramanian, Redmond, WA (US); Zainab Hakim, Redmond, WA (US); Valentina Li, Bellevue, WA (US); Michal Jama, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 260 days.

(21) Appl. No.: 15/828,159

(22) Filed: Nov. 30, 2017

(65) Prior Publication Data
US 2019/0163528 A1 May 30, 2019

(51) Int. Cl.
*G06F 9/50* (2006.01)
*H04L 12/24* (2006.01)
(Continued)

(52) U.S. Cl.
CPC ............ *G06F 9/505* (2013.01); *G06F 9/5083* (2013.01); *H04L 41/0654* (2013.01);
(Continued)

(58) Field of Classification Search
CPC .................. G06F 9/505; G06F 9/5083; G06F 2209/5019; G06F 11/3442; G06F 9/5072;
(Continued)

(56) References Cited

U.S. PATENT DOCUMENTS 6,874,106 B2 * 3/2005 Suzuyama .......... H04L 29/1215
709/224
7,805,529 B2 * 9/2010 Galluzzo ................ H04L 67/14
709/227
(Continued)

FOREIGN PATENT DOCUMENTS

WO    2012162167 A2    11/2012

OTHER PUBLICATIONS

Lionel, Gibbons, "What Is Cloud Bursting, and Why Is It Important?", Retrieved from: https://www.brightcomputing.com/blog/what-is-cloud-bursting-and-why-is-it-important, Oct. 17, 2017, 8 Pages.
(Continued)

*Primary Examiner* — Jimmy H Tran
(74) *Attorney, Agent, or Firm* — Liang IP, PLLC

(57) ABSTRACT

Techniques for automated capacity managed in distributed computing systems are disclosed herein. In one embodiment, a method includes receiving predicting one or more future usage levels of a computing resource in the distributed computing system based on received data representing historical usage levels of the computing resource and determining whether a currently available capacity of the computing resource in the distributed computing system is depleted beyond a threshold time period based on the one or more future usage levels. In response to determining that the currently available capacity of the computing resource in the distributed computing system is depleted before the threshold time period, the method includes immediately rebooting, reimaging, or performing other recovery actions on one or more out-for-repair hosts that provide the computing resource.

20 Claims, 8 Drawing Sheets

(51) Int. Cl.
*H04L 12/26* (2006.01)
*H04L 29/08* (2006.01)
*H04L 12/911* (2013.01)

(52) U.S. Cl.
CPC ............ *H04L 43/16* (2013.01); *H04L 47/823* (2013.01); *H04L 67/1004* (2013.01); *G06F 2209/5019* (2013.01)

(58) Field of Classification Search
CPC ............. G06F 2201/81; G06F 11/3452; H04L 47/823; H04L 67/1004; H04L 43/16; H04L 41/0654
See application file for complete search history.

(56) References Cited

U.S. PATENT DOCUMENTS

| | | | | |
|---|---|---|---|---|
| 8,132,043 B2* | 3/2012 | Dash | ................... | G06F 11/0709 714/4.1 |
| 8,176,168 B1* | 5/2012 | Ramamurthy | ...... | G06F 11/0712 709/224 |
| 8,539,080 B1* | 9/2013 | Uluderya | ................ | H04L 45/70 709/226 |
| 8,904,008 B2* | 12/2014 | Calder | .................. | G06F 9/5033 709/226 |
| 9,152,405 B2* | 10/2015 | De | ....................... | G06F 9/45533 |
| 9,300,577 B2* | 3/2016 | Uluderya | ................ | H04L 45/70 |
| 9,442,715 B2* | 9/2016 | Zhang | ....................... | G06F 8/65 |
| 9,444,762 B2* | 9/2016 | Pabari | .................. | G06F 9/5072 |
| 9,483,335 B1* | 11/2016 | Wagner | ............... | G06F 9/45533 |
| 9,501,361 B2* | 11/2016 | Bates | .................. | G06F 11/1092 |
| 9,600,380 B2* | 3/2017 | Mizuno | ............... | G06F 11/1438 |
| 9,912,782 B2* | 3/2018 | Simkin | ............... | H04L 43/0811 |
| 9,954,747 B2* | 4/2018 | Sridhar | ............... | H04L 41/5003 |
| 10,162,688 B2* | 12/2018 | Wagner | ............... | G06F 9/45533 |
| 10,320,892 B2* | 6/2019 | Smith | ................... | G06F 9/5061 |
| 10,374,930 B2* | 8/2019 | Cai | ....................... | H04L 67/325 |
| 2003/0028817 A1* | 2/2003 | Suzuyama | .......... | H04L 29/1215 714/4.1 |
| 2007/0016663 A1* | 1/2007 | Weis | .................... | G06F 11/2028 709/223 |
| 2007/0220303 A1* | 9/2007 | Kimura | ............... | G06F 11/0709 714/4.11 |
| 2008/0016214 A1* | 1/2008 | Galluzzo | ................ | H04L 67/322 709/226 |
| 2009/0077233 A1* | 3/2009 | Kurebayashi | ......... | G06F 9/4843 709/224 |
| 2009/0210876 A1* | 8/2009 | Shen | ........................ | G06F 9/505 718/100 |
| 2009/0276771 A1* | 11/2009 | Nickolov | .............. | G06F 9/4856 717/177 |
| 2010/0131959 A1* | 5/2010 | Spiers | ....................... | G06F 9/50 718/105 |
| 2011/0154092 A1* | 6/2011 | Dash | ................... | G06F 11/0709 714/2 |
| 2012/0311022 A1* | 12/2012 | Watanabe | ............. | G06F 9/5083 709/203 |
| 2013/0055241 A1* | 2/2013 | De | ............................ | G06F 8/63 718/1 |
| 2013/0086273 A1 | 4/2013 | Wray et al. | | |
| 2013/0179574 A1* | 7/2013 | Calder | ................... | G06F 9/5033 709/226 |
| 2013/0318527 A1* | 11/2013 | Tamura | ................. | G06F 9/5072 718/1 |
| 2013/0322230 A1* | 12/2013 | Shaik | .................. | H04L 41/0654 370/216 |
| 2014/0006597 A1* | 1/2014 | Ganguli | ................ | G06F 9/5072 709/224 |
| 2014/0075035 A1* | 3/2014 | Revanuru | ............. | G06F 9/5072 709/226 |
| 2014/0173130 A1* | 6/2014 | Uluderya | ................ | H04L 45/70 709/238 |
| 2014/0325072 A1 | 10/2014 | Zhang et al. | | |
| 2014/0344462 A1* | 11/2014 | Pabari | ................... | G06F 9/5072 709/226 |
| 2014/0372601 A1* | 12/2014 | Suzuki | ................. | H04L 41/5022 709/224 |
| 2015/0149813 A1* | 5/2015 | Mizuno | ............... | G06F 11/1438 714/4.11 |
| 2015/0169291 A1* | 6/2015 | Dube | ........................ | G06F 8/20 717/101 |
| 2016/0026453 A1* | 1/2016 | Zhang | ....................... | G06F 8/65 717/171 |
| 2016/0139885 A1* | 5/2016 | Dube | ........................ | G06F 8/20 717/101 |
| 2016/0139949 A1* | 5/2016 | Jagannath | ............. | G06F 9/5022 718/1 |
| 2016/0285772 A1* | 9/2016 | Wang | ................. | G06Q 30/0207 |
| 2017/0116051 A1* | 4/2017 | Wagner | ............... | G06F 9/45533 |
| 2017/0180512 A1* | 6/2017 | Simkin | ............... | H04L 43/0811 |
| 2017/0222910 A1* | 8/2017 | Cai | ........................ | H04L 43/16 |
| 2017/0244593 A1* | 8/2017 | Rangasamy | ........ | H04L 41/0654 |
| 2017/0269986 A1* | 9/2017 | Sobue | ................. | G06F 11/0709 |
| 2017/0279674 A1* | 9/2017 | Zhu | ..................... | H04L 41/0806 |

OTHER PUBLICATIONS

"International Search Report and Written Opinion Issued in PCT Application No. PCT/US2018/062370", dated Feb. 25, 2019, 18 Pages.

\* cited by examiner

AUTOMATED CAPACITY MANAGEMENT IN DISTRIBUTED COMPUTING SYSTEMS

BACKGROUND

Cloud computing allows multiple users to access and share pools of configurable computing resources over a computer network, such as the Internet. Such shared computing resources can include one or more datacenters or other suitable distributed computing systems in which routers, switches, bridges, load balancers, or other network devices interconnect a large number of servers, network storage devices, and other computing devices. Individual servers can host virtual machines, virtual switches, or other types of virtualized functions configured to provide computation, communications, storage, or other suitable types of computing services to multiple users at the same or different times. Such computing services are commonly referred to as "cloud computing services" or "cloud services."

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Implementing cloud services involves utilizing many physical servers or other suitable types of computing devices, interconnected by a computer network to provide application execution, data storage, data retrieval, or other suitable computing tasks. A management controller, such as a fabric controller, a cluster controller, etc., is often utilized to monitor operating status of and facilitate functionalities performed by the individual hosts. For example, a fabric controller monitors whether a host or components thereof has failed. In response to detecting a failure of the host or components thereof, the fabric controller can attempt to remedy the detected failure by, for instance, migrating virtual machines hosted on the failed host to other hosts in the distributed computing system, restarting the failed host, replacing hardware components of the failed host, and/or perform other suitable recovery actions.

During operation, users can place various demands on the shared computing resources in a pool of computing resources such as in a cluster, a datacenter, a region, an availability zone, etc. Such varying demands can increase or decrease with respect to time because many actions or operations of the users within the shared pool can impact computing capacity available in the pool. For instance, scheduling operations for recovery of failed hosts, enforcing usage quota for users, and implementing service offer restrictions can all have an impact on available capacity. As such, due to the variety of user actions, service interruptions to users may occur because the shared pool of computing resources can be exhausted by user demands. In addition, when a capacity shortage occurs in a shared pool, often multiple actions may be taken to reduce or remedy the capacity shortage. However, not all actions may be undertaken for a location or have similar associated costs. For example, capacity shortage in a datacenter with limited housing space may not be remedied by adding more physical servers because the datacenter cannot accommodate any additional servers.

Several embodiments of the disclosed technology provide an automated capacity controller configured to leverage domain knowledge of historical usage data in a shared pool of computing resources to predict a user demand in near future, e.g., seven days or one month. Example domain knowledge can include user demand growths, current capacities for different virtual machine sizes, offer restrictions in different regions for different users, statuses of out-of-repair nodes, approved usage quota, etc. Based on the predicted demand growth and currently available resource capacities, a signal can be generated to, for example, prioritize recovery for out-for-repair servers in regions where capacity shortage is predicted, or to expedite installation of additional servers in these regions. Similarly, for regions in which datacenters may not be expanded, another signal can be generated to recommend a suitable offer restriction for different cloud services.

In certain implementations, the automated capacity controller can include a server or a computing service that is configured to receive data of historical and/or current usage levels of various resource types within a shared pool (e.g., an availability zone) of computing resources. Example resource types can include virtual machines of various capacity sizes, cloud storage with various data capacities, etc. The automated capacity controller can then predict a demand of the various resource types in one month, two months, or other suitable period in the future using curve fitting, function approximation, autoregressive integrated moving average ("ARIMA"), or other suitable time series models. For example, the automated capacity controller can determine a predicted usage level for a virtual machine of a certain size in one month based on historical usage level fluctuations.

Optionally, in certain embodiments, the predicted usage level can also be adjusted based on various operating conditions that can impact capacity in the distributed computing system. For example, an offer restriction can artificially decrease a usage level of a resource type in a shared pool by disallowing users to deploy resources of the resource type. As such, to account for the offer restriction, the predicted usage level can be reduced or otherwise adjusted based on, for instance, another usage level in a similar shared pool that does not have such offer restriction imposed. In other embodiments, the predicted usage level can also be adjusted based on usage quota approval, indication of previous allocation failures or other suitable operating conditions.

The automated capacity controller can also be configured to determine a currently available amount of various types of resources, for example, a number of instances of virtual machine that can be deployed in the shared pool. In one embodiment, the automated capacity controller can query cluster controllers, fabric controllers, or other suitable management controllers in a distributed computing system for such information. In other embodiments, the automated capacity controller can attempt to instantiate an instance of a resource type (e.g., a virtual machine) and determine how many more instances may be provided in the shared pool. In further embodiments, the automated capacity controller can determine the currently available resources in other suitable manners.

Based on the determined currently available resources and the predicted user demand, the automated capacity controller can then determine an inventory level of the various resource types in terms of, for instance, a number of days/weeks/months after which the currently available resources would be exhausted. The automated capacity controller can then compare the determined inventory levels to corresponding thresholds to determine whether a capacity shortage would likely occur in the near future. For example, if a virtual machine of a certain size has an inventory level (e.g., seven days) that is less than a corresponding threshold (e.g., ten days), the automated capacity controller can indicate that a capacity shortage of virtual machine of that size is likely to occur. As such, the automated capacity controller can provide an understanding of both a quantity and quality of potential capacity shortage in the distributed computing system.

Upon indicating a capacity shortage, the automated capacity controller can trigger various remedial actions in the distributed computing system. For example, the automated capacity controller can prioritize rehabilitation of our-for-recovery servers designed to provide the resource type that is indicated to have capacity shortage. Such rehabilitation can include rebooting, reimaging, replacing hardware components, or performing other suitable recovery actions on the our-for-recovery servers. In another example, the automated capacity controller can also send out an alert, for instance, as an email to an administrator to trigger usage quota or offer restriction implementations. In another example, the automated capacity controller can also trigger expedited built-out of clusters or servers designed to provide the resource type that is indicated to have capacity shortage. In a further example, the automated capacity controller can trigger a rebalance of loads between an on-premise cloud computing system and a public cloud computing system. In yet a further example, the automated capacity controller can perform a risk assessment of service failure based on the inventory level and a service level agreement with the users and perform remedial actions when the service level agreement is expected to be violated.

Several embodiments of the disclosed technology can thus improve reliability of cloud services by reducing a risk of unexpectedly exhausting computing resources in distributed computing systems. Thus, instead of being reactive to service outages due to resource exhaustion, the distributed computing system can proactively prevent such occurrences. As such, user experience with the provided cloud services may be enhanced.

DETAILED DESCRIPTION

Figure 1:
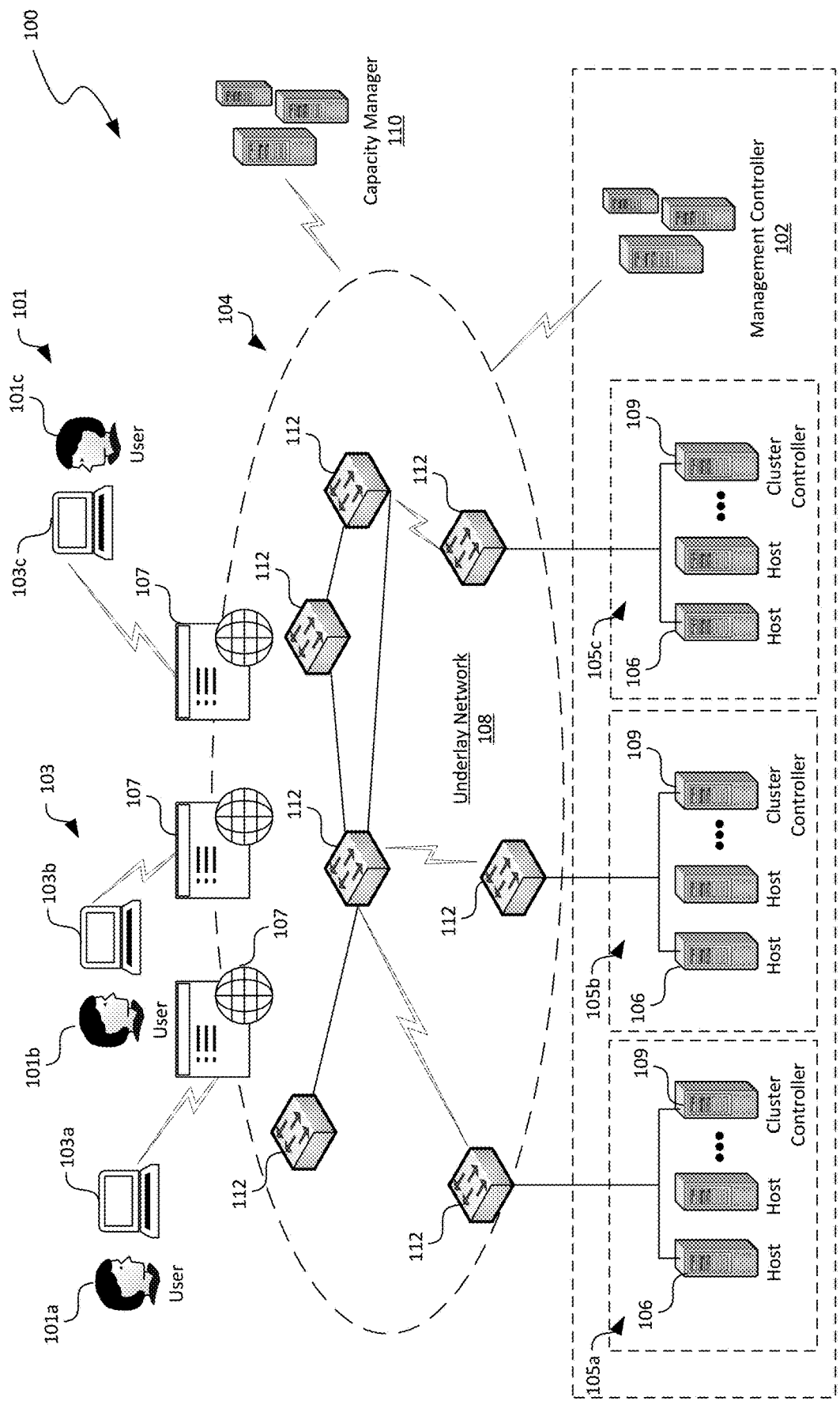
FIG. 1 is a schematic diagram of a distributed computing system implementing automated capacity management in accordance with embodiments of the disclosed technology.

Certain embodiments of computing systems, devices, components, modules, routines, and processes for automated capacity management in distributed computing systems are described below. In the following description, specific details of components are included to provide a thorough understanding of certain embodiments of the disclosed technology. A person skilled in the relevant art can also understand that the disclosed technology may have additional embodiments or may be practiced without several of the details of the embodiments described below with reference to FIGS. 1-8.

As used herein, the term "computing cluster" generally refers to a computer system having a plurality of network devices that interconnect multiple servers or hosts to one another or to external networks (e.g., the Internet). One example of a computing cluster is one or more racks each holding multiple servers in a cloud computing datacenter (or portions thereof) configured to provide cloud services. One or more computing clusters can be interconnected to form a "computing fabric." The term "network device" generally refers to a network communications component. Example network devices include routers, switches, hubs, bridges, load balancers, security gateways, or firewalls. A "host" generally refers to a server or other suitable types of computing device configured to implement one or more virtual machines, virtual routers, virtual gateways, or other suitable virtualized computing components. For example, a host can include a server executing suitable instructions to provide a hypervisor configured to support one or more virtual machines for one or more users or tenants on the same server.

Also used herein, the term "cloud service" or "computing service" generally refers to computing resources provided over a computer network such as the Internet. Common examples of cloud services include software as a service ("SaaS"), platform as a service ("PaaS"), and infrastructure as a service ("IaaS"). SaaS is a software distribution technique in which software applications are hosted by a cloud service provider in, for instance, datacenters, and accessed by users over a computer network. PaaS generally refers to delivery of operating systems and associated services over the computer network without requiring downloads or installation. IaaS generally refers to outsourcing equipment used to support storage, hardware, servers, network devices, or other components, all of which are made accessible over a computer network.

Further, as used herein, the term "computing resource" generally refers to a physical or virtual component of a limited availability within a distributed computing system. In one example, computing resources can include servers, processor cores, or other hardware computing devices or internal components thereof. In another example, computing devices can also include virtual machines, cloud storage spaces, communications bandwidths, or other suitable virtual computing resources. Also, the term "capacity" refers to an amount of computing resources of certain resource types in a cluster, datacenter, or region that is available to be consumed by users of cloud services. One example capacity of computing resources can include a number of processors, cores, or virtual machines of certain sizes that can be deployed in a region. In certain situations, available capacities can be represented by an inventory level such as days to exhaustion ("DTE"). For instance, if an available capacity of virtual machines is one thousand instances and a demand for the virtual machines is expected to increase by one hundred a day, then the inventory level for the virtual machines is ten days as measured in DTE.

Implementing cloud computing services typically involves utilizing many shared computing resources to provide application execution, data storage, data retrieval, or other suitable computing operations to many users. During operation, various conditions and actions by the users can impact an available capacity of the shared computing resources. In certain cloud computing systems, such conditions and actions can result in exhaustion of the available capacity of the computing resource. Such exhaustion can cause service outages and negatively impact user experience.

Several embodiments of the disclosed technology can leverage domain knowledge of historical usage data in a shared pool of computing resources to predict a user demand in near future. Based on the predicted user demand and currently available capacity, an inventory level of a type of shared computing resources can thus be determined. If the inventory level falls below a predetermined threshold, a capacity shortage may be declared. Once declared, certain remedial actions may be taken. For example, repair of out-for-repair servers configured to provide such computing resources may be prioritized over other servers. Through such remedial actions, the risk of resource exhaustion may be reduced, and thus improving user experience of the cloud computing services, as described in more detail below with reference to FIGS. 1-8.

FIG. 1 is a schematic diagram illustrating a distributed computing system 100 implementing automated capacity management in accordance with embodiments of the disclosed technology. As shown in FIG. 1, the distributed computing system 100 can include an underlay network 108 interconnecting a plurality of client devices 103 (shown as first, second, and third client devices 103a-103c, respectively) of corresponding users 101 (shown as first, second, and third user 101a-101c, respectively), a computing fabric 104, and a capacity manager 110. Even though particular components are shown in FIG. 1, in other embodiments, the distributed computing system 100 can also include additional and/or different constituents. For example, the distributed computing system 100 can include network storage devices, utility infrastructures, and/or other suitable components in addition to or in lieu of those shown in FIG. 1.

The client devices 103 can each include a computing device that facilitates corresponding users 101 to access cloud services provided by the hosts 106 via the underlay network 108. For example, in the illustrated embodiment, the client devices 103 individually include a desktop computer. In other embodiments, the client devices 103 can also include laptop computers, tablet computers, smartphones, or other suitable computing devices. Even though two users 101 are shown in FIG. 1 for illustration purposes, in other embodiments, the distributed computing system 100 can facilitate any suitable number of users 101 to access suitable types of cloud computing services provided by the hosts 106.

As shown in FIG. 1, the underlay network 108 can include one or more physical network devices 112 that interconnect the client devices 103, the computing fabric 104, and the capacity manager 110. Examples of the network devices 112 can include routers, switches, firewalls, load balancers, or other suitable network components. Even though particular connection scheme is shown in FIG. 1 for illustration purposes, in other embodiments, the network devices 112 can be operatively coupled in a hierarchical, flat, "mesh," or other suitable topologies.

The computing fabric 104 can include a management controller 102 and a plurality of hosts 106 operatively coupled to one another by the network devices 112. In certain embodiments, the hosts 106 can individually include a physical server or a computing blade having several physical servers. In other embodiments, the hosts 106 can also include one or more physical servers with multiple processor cores, or other suitable types of computing devices.

The hosts 106 can be organized into racks, availability zones, groups, sets, computing clusters, or other suitable divisions. For example, in the illustrated embodiment, the hosts 106 are grouped into three computing clusters 105 (shown individually as first, second, and third computing clusters 105a-105c, respectively), which are operatively coupled to corresponding network devices 112 in the underlay network 108. Even though three computing clusters 105 are shown in FIG. 1 for illustration purposes, in other embodiments, the computing fabric 104 can include one, two, eight, sixteen, or any other suitable numbers of computing clusters 105 with similar or different components and/or configurations.

Each cluster 105 can also include a cluster controller 109 configured to monitor status and manage operations of the hosts 106 in the corresponding computing cluster 105. For example, the cluster controller 109 can monitor whether a host 106 or components thereof has failed. In response to detecting a failure of the host 106 or components thereof, the cluster controller 109 can attempt to remedy the detected failure by, for instance, migrating virtual machines hosted on the failed host 106 to other hosts 106 in the same cluster 105, restarting the failed host 106, replacing hardware components of the failed host 106, and/or perform other suitable operations. Though the cluster controllers 109 are shown as separate physical servers in FIG. 1, in other embodiments, the cluster controllers 109 can also include computing services provided by one or more of the hosts 106 in corresponding computing clusters 105.

The management controller 102 can be configured to monitor, control, or otherwise manage operations of the computing clusters 105. For example, in certain embodiments, the management controller 102 can include a fabric controller configured to manage processing, storage, communications, or other suitable types of hardware resources in the computing clusters 105 for hosting desired computing services. In other embodiments, the management controller 102 can also include a datacenter controller, application delivery controller, or other suitable types of controller. In the illustrated embodiment, the management controller 102 is shown as being separate from the computing clusters 105. In other embodiments, the management controller 102 can include one or more hosts 106 in the computing clusters 105. In further embodiments, the management controller 102 can include software services hosted on one or more of the hosts 106 in the computing clusters 105.

The capacity manager 110 can be configured to proactively monitor inventory levels of various computing resources available in the distributed computing system 100. For example, the capacity manager 110 can receive historical and/or current usage data of various computing resources and predict based thereon, future demand levels for the various computing resources. Based on the predicted future demand levels, the capacity manager 110 can determine inventory levels of the computing resources, for instance, in terms of a period of time after which the computing resources would be exhausted. If the inventory levels fall below certain thresholds (e.g., less than ten days), the capacity manager 110 can be configured to indicate a type and an amount of capacity shortage for the computing devices. The capacity manager 110 can also be configured to trigger various remedial actions for curing such capacity shortage. Example remedial actions can include prioritizing out-for-repair hosts 106 that are designed to provide the type of computing resources in shortage, or other suitable actions.

Even though the capacity manager 110 is shown in FIG. 1 as a separate component from the management controller 102 and the hosts 106 of the distributed computing system 100, in other embodiments, certain functionalities of the capacity manager 110 can a part of the management controller 102 or one or more of the cluster controllers 109. In further embodiments, other functionalities of the capacity manager 110 can also be provided as one or more computing services hosted on one or more of the hosts 106 in the computing fabric 104. Certain example components of the capacity manager 110 and details of operations are described in more detail below with reference to FIGS. 3-6.

In operation, the users 101 can request various computing services (e.g., deployment of a site) via, for example, user portals 107 presented on corresponding client devices 103. In response, the management controller 102 can allocate one or more hosts 106 or other computing resources to execute suitable instructions to provide the requested computing services. Once allocated, the computing resources may be unavailable to other users 101 until the requested computing services have been terminated. As such, available capacity of various computing resources can fluctuate in the distributed computing system 100. In certain situations, the computing resources may be exhausted such that the request from the users 101 for computing services would fail. Such failures can negatively impact user experience of the computing services.

Unlike in other computing systems, several embodiments of the distributed computing system 100 can proactively monitor for inventory levels of various computing resources in the distributed computing system 100. If an inventory level falls below a threshold, the capacity manager 110 can declare a capacity shortage and automatically trigger various remedial actions. For example, the capacity manager 110 can detect that an inventory level for deploying additional virtual machines 144 (shown in FIG. 2) on the host 106 falls below a threshold. In response, the capacity manager 110 can trigger expedited build-out of additional hosts 106 in the computing clusters 105. As such, service interruptions to the users 101 due to capacity exhaustion can be reduced when compared to reactive remedial techniques, as described in more detail below with reference to FIGS. 2-6.

Figure 2:
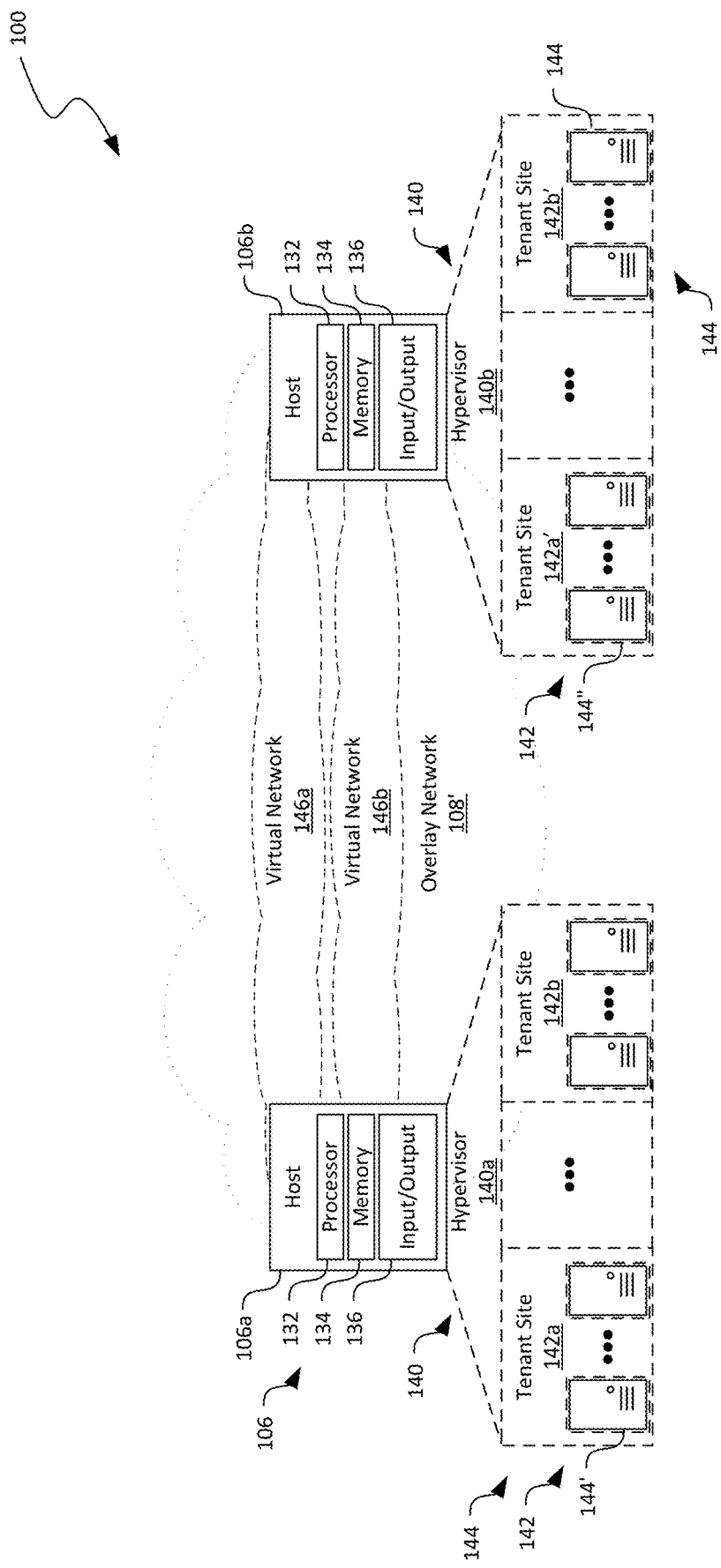
FIG. 2 is a schematic diagram illustrating certain hardware/software components of the distributed computing system of FIG. 1 in accordance with embodiments of the disclosed technology.

FIG. 2 is a schematic diagram illustrating certain hardware/software components of the distributed computing system 100 of FIG. 1 in accordance with embodiments of the disclosed technology. In FIG. 2, only certain components of the distributed computing system 100 of FIG. 1 are shown for clarity. As shown in FIG. 2, the first host 106a and the second host 106b can each include a processor 132, a memory 134, and an input/output component 136 operatively coupled to one another. The processor 132 can include a microprocessor, a field-programmable gate array, and/or other suitable logic devices. The memory 134 can include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the processor 132 (e.g., instructions for performing the methods discussed below with reference to FIGS. 7A-7C). The input/output component 136 can include a network interface card or other suitable types of input/output devices configured to accept input from and provide output to an operator and/or an automated software controller (not shown).

The memory 134 of the first and second hosts 106a and 106b can include instructions executable by the corresponding processors 132 to cause the individual hosts 106 to provide a hypervisor 140 (identified individually as first and second hypervisors 140a and 140b) and other suitable virtual components such as virtual network interface card, virtual switches, etc. (not shown). The hypervisors 140 can individually be configured to initiate, monitor, terminate, and/or otherwise locally manage one or more virtual machines 144 organized into tenant sites 142. For example, as shown in FIG. 2, the first host 106a can provide a first hypervisor 140a that manages first and second tenant sites 142a and 142b, respectively, for the same or different tenants or users 101 (FIG. 1). The second host 106b can provide a second hypervisor 140b that manages first and second tenant sites 142a' and 142b', respectively.

The hypervisors 140 can be software, firmware, or hardware components. The tenant sites 142 can each include multiple virtual machines 144 or other suitable tenant instances for a tenant. For example, the first host 106a and the second host 106b can both host the tenant site 142a and 142a' for a first user 101a. The first host 106a and the second host 106b can both host the tenant site 142b and 142b' for a second user 101b (FIG. 1). Each virtual machine 144 can be executing a corresponding operating system, middleware, and/or applications.

Also shown in FIG. 2, the distributed computing system 100 can include one or more virtual networks 146 that interconnect the tenant sites 142a and 142b across multiple hosts 106. For example, a first virtual network 142a interconnects the first tenant sites 142a and 142a' at the first host 106a and the second host 106b. A second virtual network 146b interconnects the second tenant sites 142b and 142b' at the first host 106a and the second host 106b. Even though a single virtual network 146 is shown as corresponding to one tenant site 142, in other embodiments, multiple virtual networks 146 (not shown) may be configured to correspond to a single tenant site 146.

The virtual machines 144 on the virtual networks 146 can communicate with one another via the underlay network 108 (FIG. 1) even though the virtual machines 144 are located on different hosts 106. Communications of each of the virtual networks 146 can be isolated from other virtual networks 146. In certain embodiments, communications can be allowed to cross from one virtual network 146 to another through a security gateway or otherwise in a controlled fashion. A virtual network address can correspond to one of the virtual machine 144 in a virtual network 146. Thus, different virtual networks 146 can use one or more virtual network addresses that are the same. Example virtual network addresses can include IP addresses, MAC addresses, and/or other suitable addresses.

Figure 3:
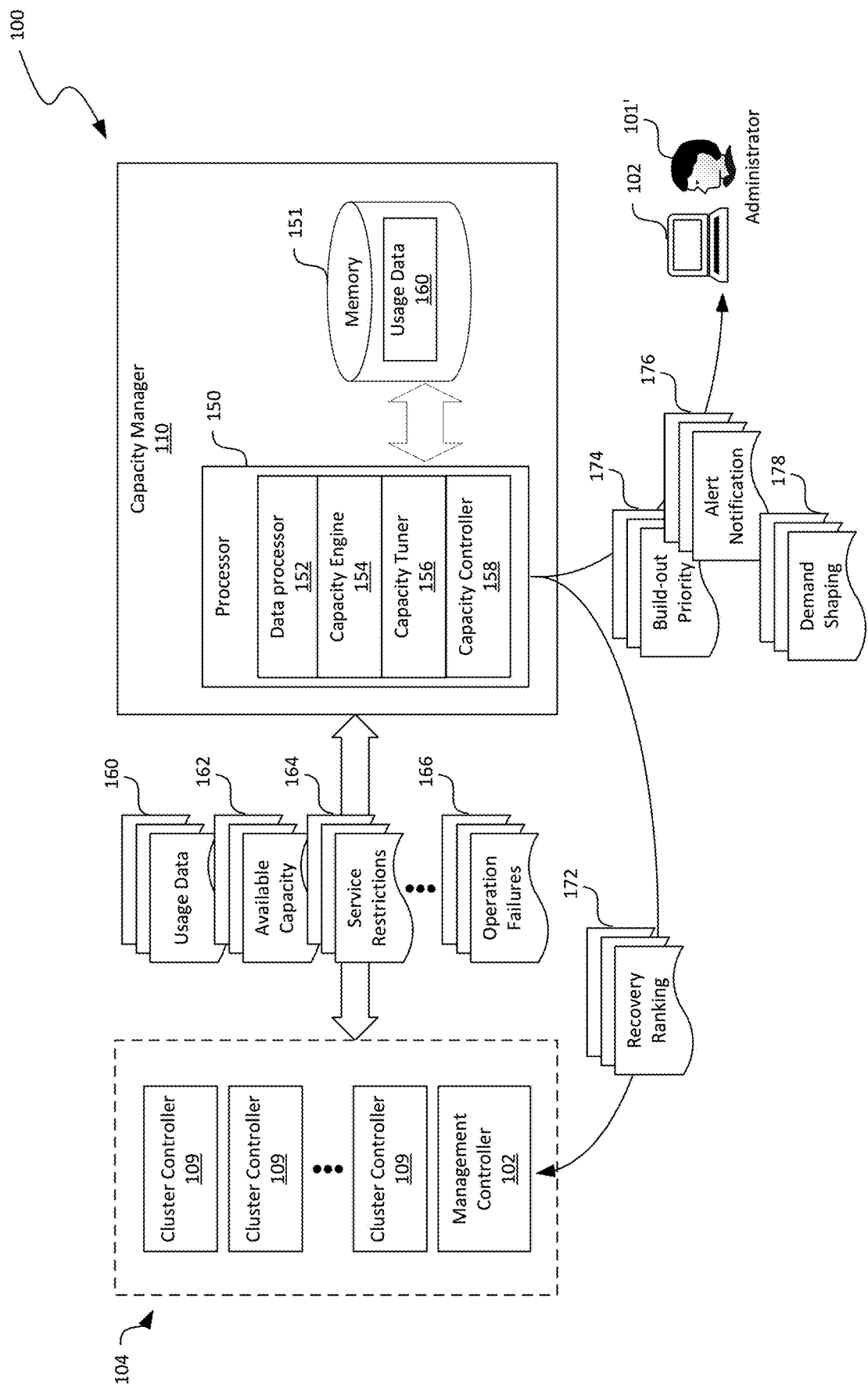
FIG. 3 is a schematic diagram illustrating certain hardware/software components of a capacity manager in the distributed computing system in accordance with embodiments of the disclosed technology.

FIG. 3 is a schematic diagram illustrating certain hardware/software components of a capacity manager 110 in the distributed computing system 100 in accordance with embodiments of the disclosed technology. In particular, in FIG. 3, certain components of the distributed computing system 100 are omitted for clarity. For example, only the management controller 102 and the cluster controllers 109 are shown in FIG. 3 as the computing fabric 104 for illustration purposes. The hosts 106 are not shown in FIG. 3.

In addition, in FIG. 2 and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads). In certain embodiments, the various components and modules described below can be implemented with actors. In other embodiments, generation of the application and/or related services can also be implemented using monolithic applications, multi-tiered applications, or other suitable components.

Components within a system can take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices. Equally, components may include hardware circuitry.

A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 3, the capacity manager 110 can include a processor 150 and a memory 151 operatively coupled to one another. The processor 150 can include a microprocessor, a field-programmable gate array, and/or other suitable logic devices. The memory 151 can include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the processor 150. In the illustrated embodiment, the processor 150 can be configured to execute instructions from, for instance, the memory 151 to provide a data processor 152, a capacity engine 154, a capacity tuner 156, and a capacity controller 158 operatively coupled to one another. In other embodiments, the processor 150 can also execute suitable instructions to provide an interface component, a network component, or other suitable types of component (not shown).

The data processor 152 can be configured to receive and process various data from different components of the computing fabric 104. For example, as shown in FIG. 3, the data processor 152 can receive usage data 160 of certain types of computing resources (e.g., deployed virtual machines 144 in FIG. 2), data representing available capacity 162 of types of computing resources (e.g., allocable capacity of virtual machines of certain sizes), data representing service restrictions currently implemented in the computing fabric 104, and indications of operation failures 166 (e.g., failures to deploy a requested virtual machine of a certain size) from the cluster controllers 109 and/or the management controller 102. In other embodiments, the data processor 152 can also receive data representing information about out-for-repair hosts 106 (FIG. 1), capacity reservations, upcoming new cluster 105 (FIG. 1), or other suitable types of data from the hosts 106 or other suitable components of the computing fabric 104.

In certain embodiments, the data processor 152 can be configured to query the cluster controllers 109, the fabric controller 102, or other suitable components of the distributed computing system 100 for the various types of data. In other embodiments, the data processor 152 can attempt to instantiate an instance of a resource type (e.g., a virtual machine 144) and determine how many more instances may be provided in the shared pool. In further embodiments, the data processor 152 can determine the currently available resources in other suitable manners. The data processor 152 can also store the received data from the computing fabric 104 in the memory 151 or other suitable storage locations. Though only the usage data 160 are shown as being stored in the memory 151, any other types of received data can be similarly stored in addition to or in lieu of the usage data 160.

The data processor 152 can also be configured to sort, filter, interpolate, extrapolate, or perform other suitable data operations on the received data from the computing fabric 104. The received data from the computing fabric 104 can have large variances or even missing data points. For example, the usage data 160 of virtual machines 144 (FIG. 2) can fluctuate in the computing fabric 104 as a function of time of day or other parameters. As such, the usage data 160 may indicate high usage levels during working hours and virtually no usage during nights. To address such large variances, the data processor 152 can be configured to aggregate the received usage data 160 on, for instance, a daily basis, in order to obtain a suitable data set for analysis by the capacity engine 154.

Figure 5:
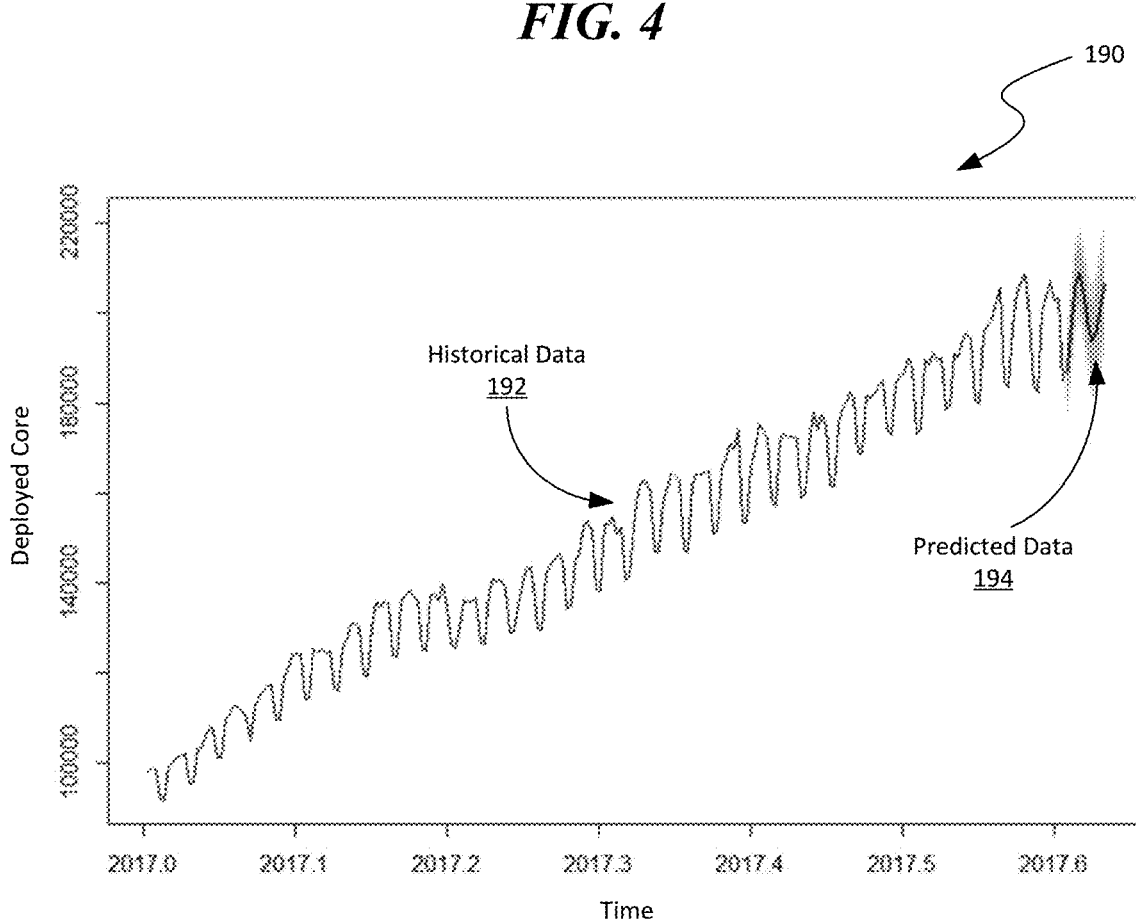
FIG. 5 is an example deployed core versus time plot illustrating prediction of future user demands in accordance with embodiments of the disclosed technology.
Figure 6:
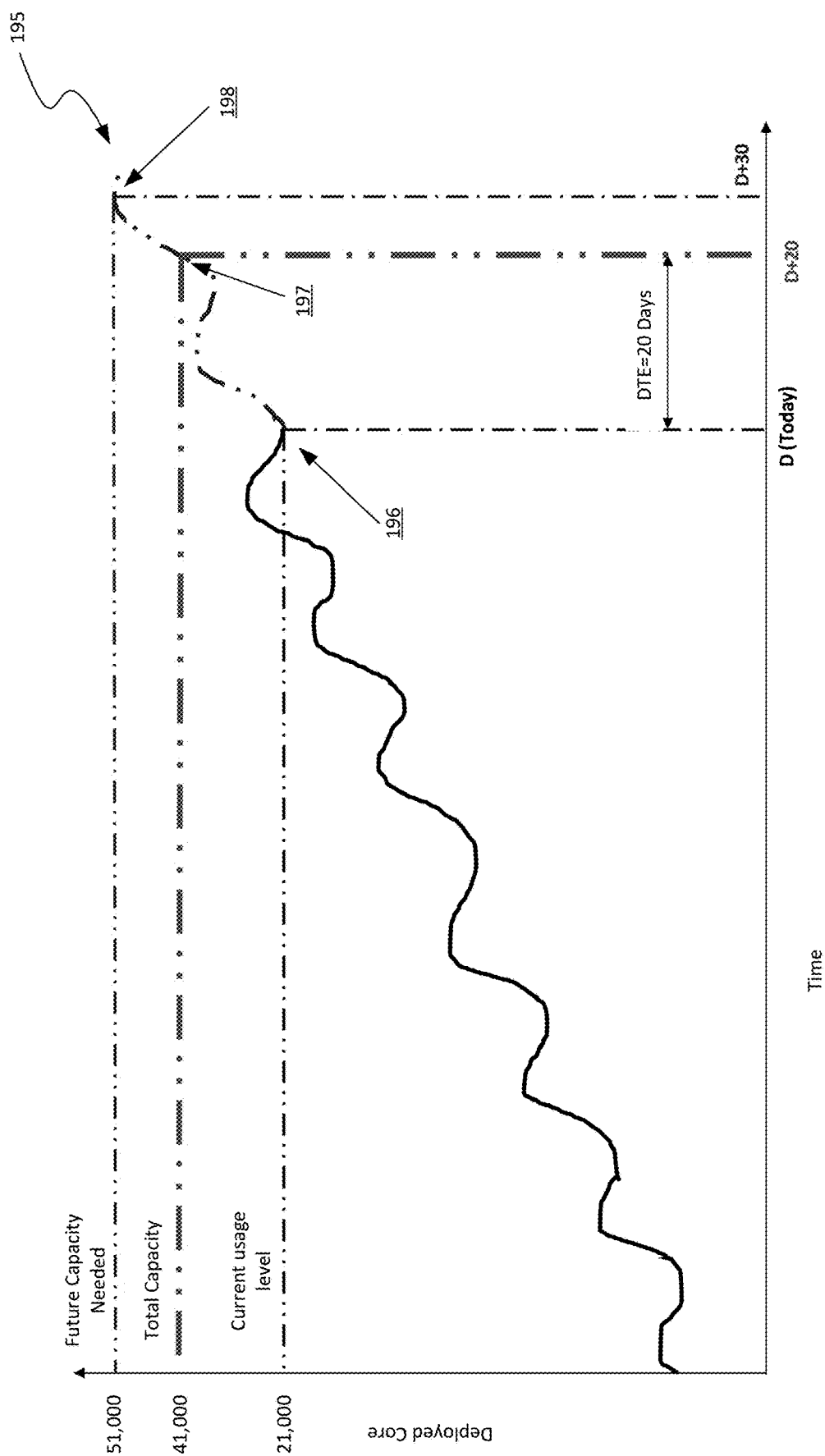
FIG. 6 is an example deployed core versus time plot illustrating days to exhaustion of current capacity based on predicted future user demand in accordance with embodiments of the disclosed technology.

The capacity engine 154 is configured to receive the processed data set of the usage data 160 from the data processor 152 and generate a future usage level for a type of computing resources based the received data set. In certain embodiments, the capacity engine 154 can be configured to determine a correlation between the usage level as a function of time using curve fitting, function approximation, autoregressive integrated moving average ("ARIMA"), or other suitable techniques. For example, the capacity engine 154 can be configured to apply ARIMA analysis on the received data set to generate a time series model for the usage level. Based on the generated model, the capacity engine 154 can extrapolate further usage levels for the computing resources. Example components of the capacity engine 154 are described below in more detail with reference to FIG. 4. An example model and associated prediction are shown in FIGS. 5 and 6.

As shown in FIG. 3, the capacity manager 110 can also include a capacity tuner 156 configured to adjust the predicted usage level from the capacity engine 154 based on, for example, service restrictions 164, operation failures 166, and/or other suitable conditions impacting capacity in the computing fabric 104. For example, the service restrictions 164 can contain data representing an offer restriction of, for instance, virtual machines 144 of a certain size. As such, a corresponding usage level for the type of virtual machines is artificially decreased by disallowing users 101 to deploy resources of such a resource type. Thus, the predicted future usage level based on artificially decreased historical usage levels may not reflect actual demand for such resources. To account for the offer restriction, capacity tuner 156 can be configured to increase, reduce, or otherwise adjusted the predicted usage level from the capacity engine 154 based on, for instance, another usage level in a similar computing fabric (not shown) that does not have such offer restriction imposed. In other embodiments, the capacity tuner 156 can also be configured to adjust the predicted usage level by applying factors, offsets, or other suitable adjustments based on usage quota approval, indication of previous allocation failures or other suitable operating conditions. In further embodiments, the capacity tuner 156 may be omitted.

Based on the predicted usage level from the capacity engine 154 and/or the capacity tuner 156, the capacity controller 158 can be configured to determine whether a capacity shortage of the type of computing resources exists in the computing fabric 104. In certain embodiments, the capacity controller 158 can be configured to determine an inventory level of resource types in terms of, for instance, a number of days/weeks/months after which the currently available resources would be exhausted, as a DTE. An example of determining a DTE is described in more detail below with reference to FIG. 6. The capacity controller 158 can then compare the determined inventory level to a corresponding threshold to determine whether a capacity shortage would likely occur soon. For example, if a virtual machine of a certain size has an inventory level (e.g., seven days) that is less than a corresponding threshold (e.g., ten days), the capacity controller 158 can indicate that a capacity shortage of virtual machine of that size exists.

Upon indicating that a capacity shortage exists, the capacity controller 158 can be configured to trigger various remedial actions. For example, as shown in FIG. 3, the capacity controller 158 can be configured to generate an alert notification 176 (e.g., via email) to an administrator 101'. The capacity controller 158 can also be configured to generate a signal of build-out priority 174 that expedites installation of hosts 106 (FIG. 1) that are designed to provide the type of computing resources experiencing the capacity shortage. The capacity controller 158 can further be configured to generate another signal of recovery ranking 172 for out-for-repair hosts 106 and transmit the recovery ranking 172 to, for instance, the management controller 102. In certain implementations, the recovery ranking 172 can be represented as a capacity score, defined as following:

$$CapacityScore(\text{resource type}) = \frac{\sum_{Cluster} AvailableEmptyHosts}{\sum_{Cluster} TotalHosts}$$

In turn, the management controller 102 and/or the cluster controllers 109 can prioritize repair of out-for-repair hosts 106 designed to provide the type of computing resources experiencing the capacity shortage. Thus, capacity of the type of computing resources experiencing the capacity shortage may be increased to avoid exhaustion of the computing resources after the DTE.

In other implementations, the capacity controller 158 can further be configured to generate a signal representing demand shaping 178. For example, if the computing fabric 104 cannot be expanded due to space or other constraints, the capacity controller 158 can be configured to generate offer restrictions that prevent the users 101 from requesting the type of computing resources experiencing capacity shortage. In further implementations, the capacity controller 158 can be configured to perform a rebalance of load distributions between, for example, an on-premise cloud computing system and a public cloud computing system by shifting compute loads therebetween.

Several embodiments of the disclosed technology can thus improve reliability of cloud services provided by the computing fabric 104. By continuously monitoring for inventory levels of various types of computing resources based on predicted future user demand, a risk of unexpectedly exhausting computing resources in the distributed computing systems 100 can be reduced or even eliminated. As such, user experience with the provided cloud services may be enhanced.

Figure 4:
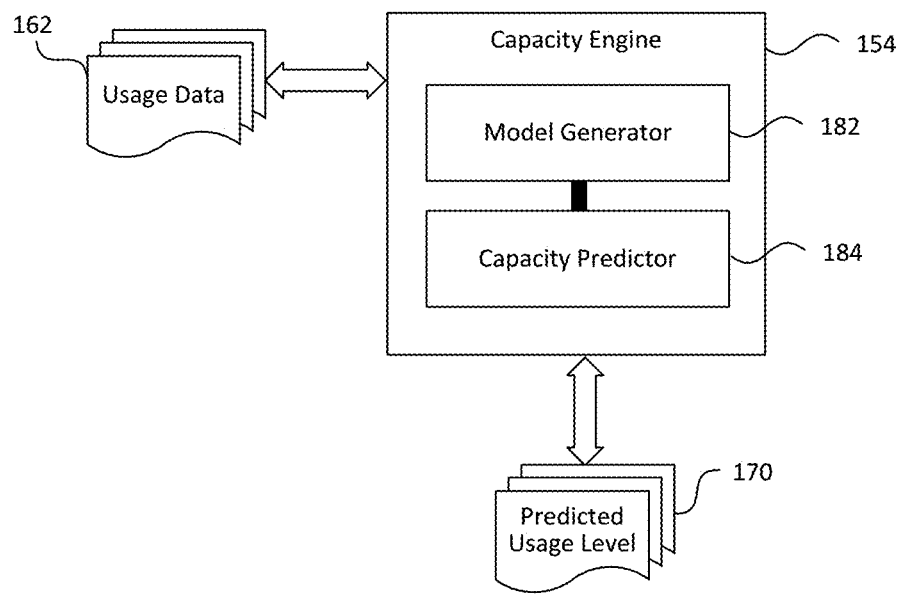
FIG. 4 is a schematic diagram illustrating a capacity engine suitable for the automated capacity manager in FIG. 3 in accordance with embodiments of the disclosed technology.

FIG. 4 is a schematic diagram illustrating a capacity engine 154 suitable for the capacity manager 110 in FIG. 3 in accordance with embodiments of the disclosed technology. As shown in FIG. 4, the capacity engine 154 can include a model generator 182 and a capacity predictor 184 operatively coupled to one another. The model generator 182 can be configured to generate a time series or other suitable types of model of the usage data 160 (FIG. 3). One example technique for generating a model is described below with reference to FIG. 7C. Based on the generated model, the capacity predictor 184 can be configured to predict a future usage level of a type of computing resources by, for example, extrapolate the generated model. The capacity predictor 184 can then provide the predicted usage level 170 to, for instance, the capacity tuner 156 in FIG. 3 for further processing.

FIG. 5 is an example deployed core versus time plot 190 illustrating prediction of future user demands in accordance with embodiments of the disclosed technology. As shown in FIG. 5, the plot 190 can include interconnected data points that represent both historical data 192 and predicted data 194 based on, for instance, an ARIMA analysis performed on the historical data 192.

FIG. 6 is an example deployed core versus time plot 195 illustrating days to exhaustion (DTE) of a current capacity based on predicted future user demand in accordance with embodiments of the disclosed technology. As shown in FIG. 6, in the illustrated example, a total of 21,000 cores are currently deployed at time point today. Based on the predicted future usage level, at time point "D+20" 197, the currently available total capacity of 41,000 cores would have been exhausted. Further, at time point "D+30" 198, if current usage patterns persist, the computing fabric 104 would need to deploy 51,000 cores. As such, embodiments of the disclosed technology can not only monitor and detect capacity shortages, but the type and amount of shortages expected in the future. As such, suitable remedial actions may be triggered to avoid resource exhaustion.

Figure 7A:
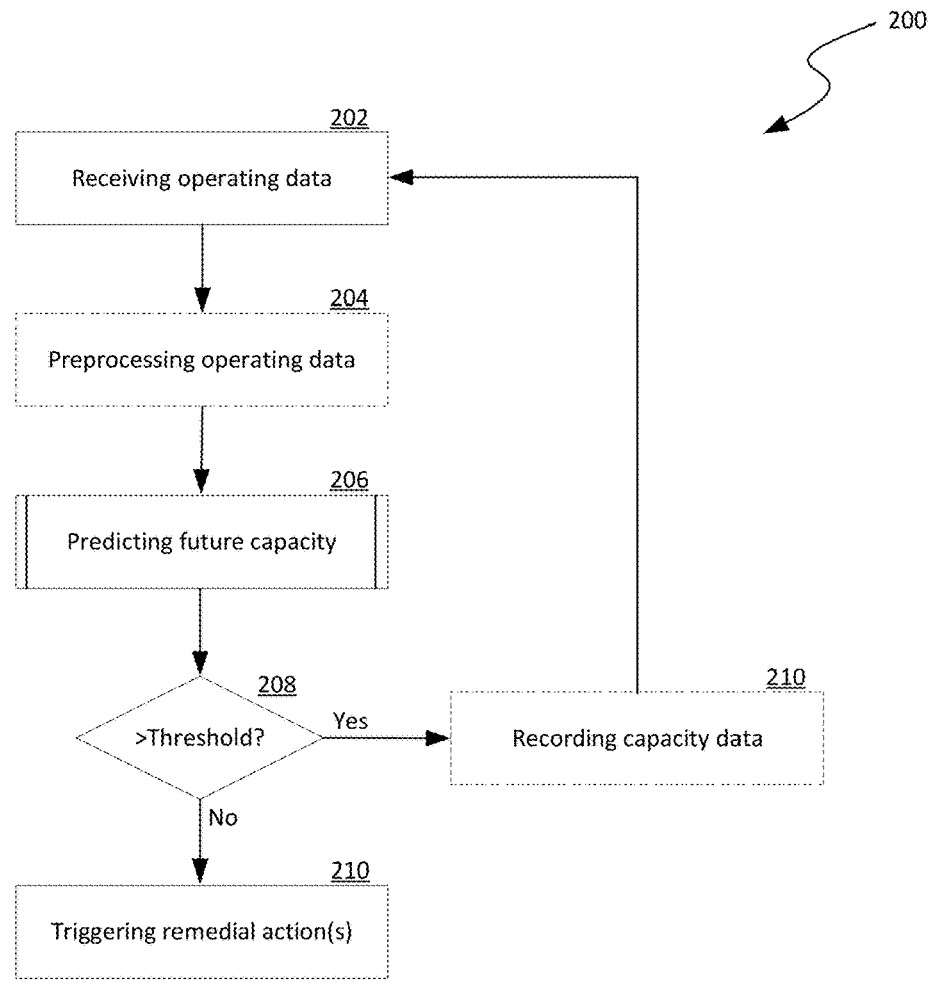
FIGS. 7A-7C are flowcharts illustrating various processes of automated capacity management in a distributed computing system in accordance with embodiments of the disclosed technology.
Figure 7B:
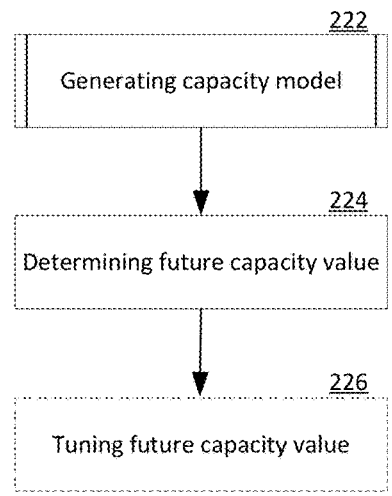
Figure 7C:
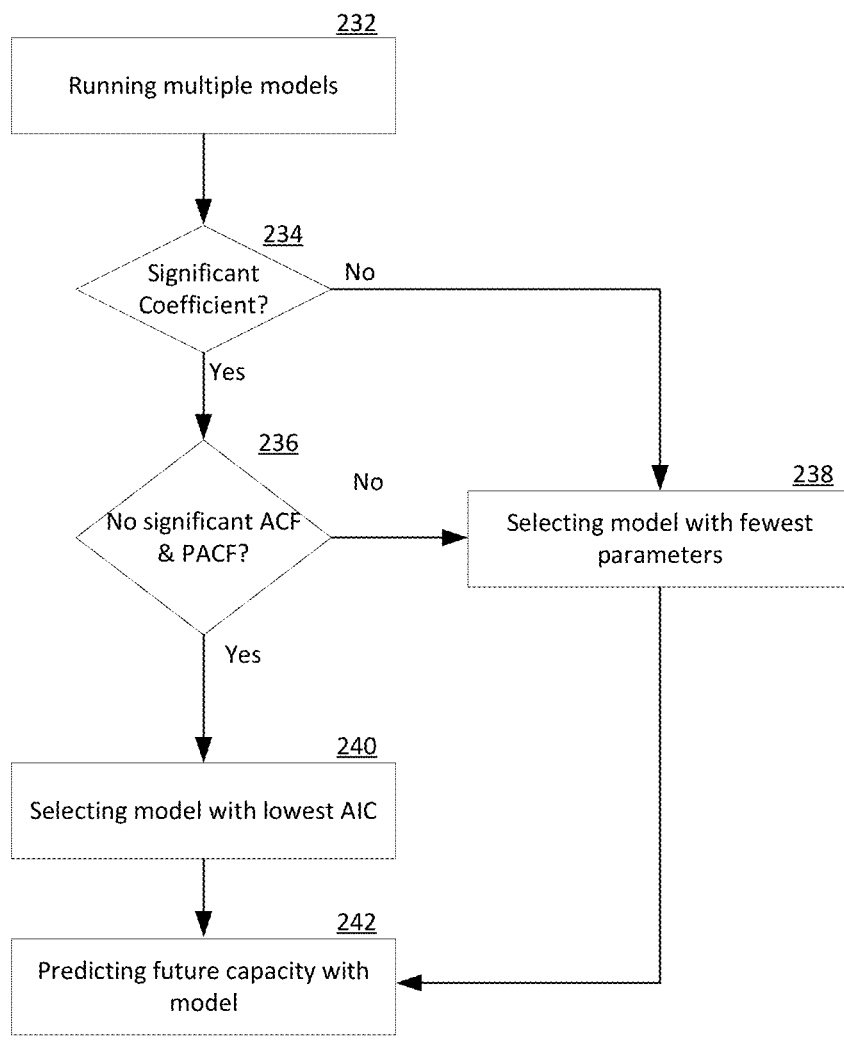

FIGS. 7A-7C are flowcharts illustrating various processes of automated capacity management in a distributed computing system in accordance with embodiments of the disclosed technology. Even though aspects of the processes are described below with reference to the distributed computing system 100 of FIGS. 1 and 2, in other embodiments, the processes can also be implemented in other computing systems with different or additional components.

As shown in FIG. 7A, the process 200 can include receiving operating data from the computing fabric 104 (FIG. 1) at stage 202. The operating data can include usage data 160 (FIG. 3), available capacity 162 (FIG. 3), service restrictions 164 (FIG. 3), operation failures 166 (FIG. 3), or other suitable data representing parameters impacting capacity in the computing fabric 104. The process 200 can then optionally include preprocessing the received operating data at stage 204. Preprocessing the received operating data can include, for example, sorting, filtering, or other suitable data operations, examples of which are described above with reference to FIG. 3.

The process 200 can then include predicting a future capacity at stage 206. In certain embodiments, predicting a future capacity includes generating a model of usage levels associated with a type of computing resources and predicting a future usage level based on the model. Then, a future capacity, for example, as represented by a DTE or other suitable inventory levels can be determined based on (i) the predicted future usage level and (ii) a currently available capacity in the computing fabric 104. In other embodiments, predicting future capacity can also include determining a capacity of the type of computing resources that can satisfy the predicted future usage level. Example operations for predicting a future capacity are described in more detail below with reference to FIG. 7B.

The process 200 can then include a decision stage 208 to determine whether the predicted future capacity is above a threshold. In response to determining that the predicted future capacity is above a threshold, the process 200 can include optionally recording the predicted capacity data at stage 210 before reverting to receiving additional operating data at stage 202. Otherwise, the process 200 can include triggering various types of remedial actions at stage 210. Example remedial actions are described above with reference to FIG. 3.

FIG. 7B illustrates example operations for predicting a future capacity. As shown in FIG. 7B, the operations can include generating a capacity model at stage 222, and determining a future capacity value based on the generated capacity model at stage 224, described above with reference to FIG. 3. The operations can also optionally include tuning the determined future capacity value based on, for instance, service restrictions, user quotas, capacity reservations, or other suitable information, as described above with reference to FIG. 3.

FIG. 7C illustrates example operations for generating a model for predicting a future capacity value. As shown in FIG. 7C, the operations can include running multiple possible time series models $M_1, M_2, \ldots, M_N$ at stage 232. The time series models can each include a series of data points indexed in a time order, for example, at successive equally spaced points in time. Based on the time series, multiple models may be generated using, for instance, ARIMA analysis. As shown in FIG. 7C, the operations can then include a decision stage 234 to determine whether any of the possible models contain significant coefficients. If there is no model satisfy this condition, the operations can include selecting a model with the fewest parameters at stage 238 before the operations proceed to predicting a future capacity with the selected model at stage 242. Otherwise, If all coefficients of at least one model are significant, then the model would be a candidate model, and the operations would proceed to another decision stage 236 to determine whether an autocorrelation function ("ACF") of the residuals and the partial autocorrelation function ("PACF") of the residuals are significant. When all the ACF and PACF are not significant, the operations include selecting the model with the lowest Akaike information criterion ("AIC") at stage 240. Otherwise, the operations can proceed to selecting a model with the fewest parameters at stage 238. The operations can further include predicting a future capacity with the selected model at stage 242.

Figure 8:
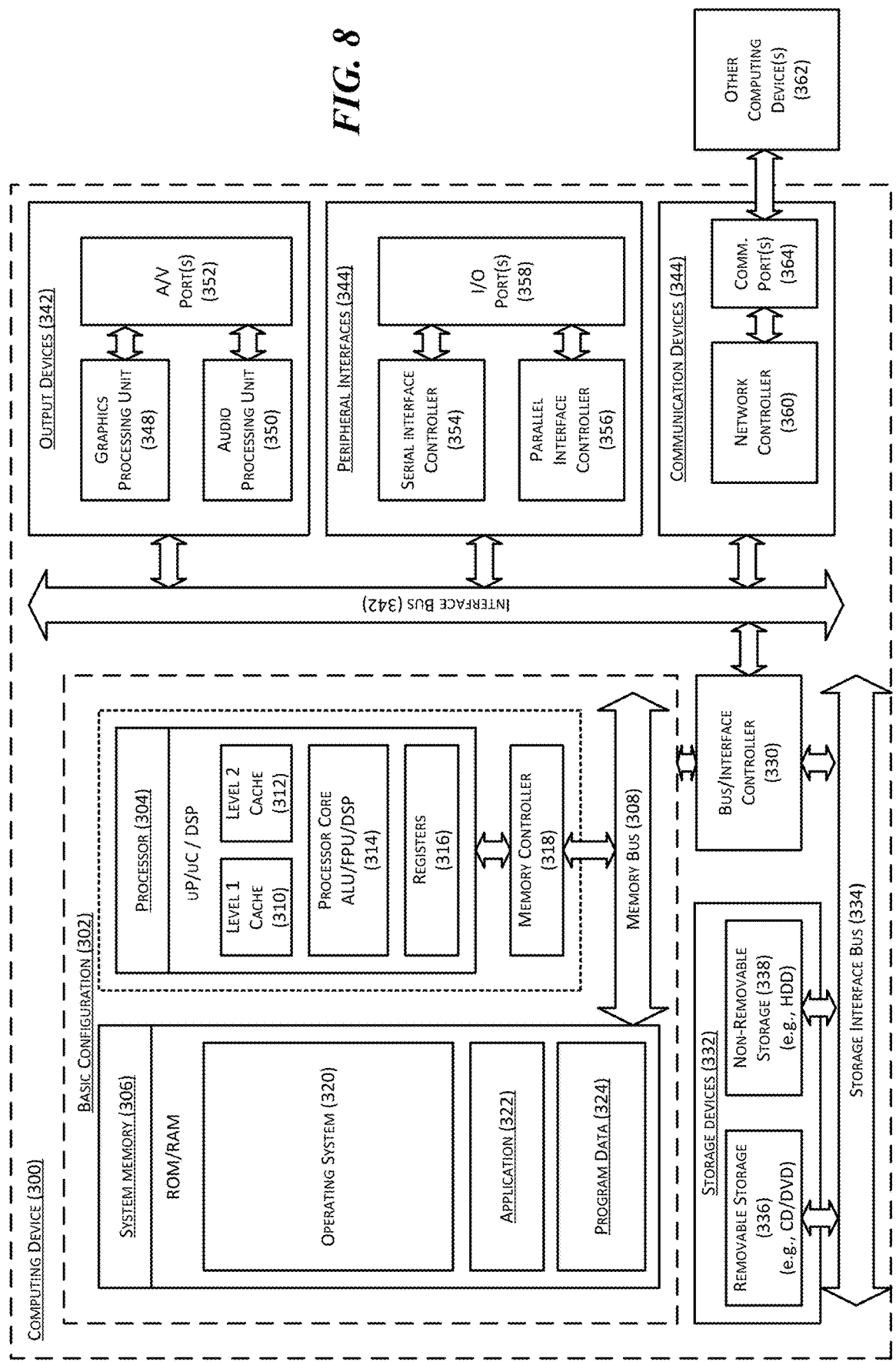
FIG. 8 is a computing device suitable for certain components of the computing system in FIG. 1.

FIG. 8 is a computing device 300 suitable for certain components of the distributed computing system 100 in FIG. 1. For example, the computing device 300 can be suitable for the hosts 106, the management controller 102, the cluster controller 109, or the capacity manager 110 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor ($\mu$P), a microcontroller ($\mu$C), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating-point unit (FPU), a digital signal processing core (DSP Core), or any combination thereof. An example memory controller 318 can also be used with processor 304, or in some implementations, memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 8 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method of capacity management in a distributed computing system having multiple hosts interconnected by a computer network, the method comprising:

accessing, via the computer network, data representing usage levels of a computing resource of a resource type and data representing a currently available capacity of the computing resource in the distributed computing system;

analyzing the received data representing the usage levels of the computing resource of the resource type to
predict one or more future usage levels of the computing resource in the distributed computing system; and
determine an inventory level of the computing resource based on the predicted one or more future usage levels and the received data representing the currently available capacity of the computing resource in the distributed computing system;

determining whether the determined inventory level exceeds a preset threshold; and in response to determining that the determined inventory level does not exceed a preset threshold, prioritizing and causing recovery of one or more out-for-repair hosts that provide the computing resource of the resource type before recovery of other out-for-repair hosts that provide computing resources of other resource types.

2. The method of claim 1 wherein analyzing the received data representing the usage levels of the computing resource of the resource type includes:

generating a time series model according to the received data representing the usage levels of the computing resource of the resource type; and based on the generated time series model, determining a days to exhaustion as the inventory level according to the received data representing a currently available capacity of the computing resource in the distributed computing system and the one or more future usage levels according to the generated model.

3. The method of claim 1 wherein:

the inventory level includes a days to exhaustion of the computing resource in the distributed computing system; and determining whether the determined inventory level exceeds a preset threshold includes determining whether the days to exhaustion exceeds the preset threshold; and in response to determining that the days to exhaustion exceeds the preset threshold, indicating no capacity shortage in the computing resource of the resource type in the distributed computing system.

4. The method of claim 1 wherein:

the inventory level includes a days to exhaustion of the computing resource in the distributed computing system; and determining whether the determined inventory level exceeds a preset threshold includes determining whether the days to exhaustion exceeds the preset threshold; and in response to determining that the days to exhaustion does not exceed the preset threshold, indicating capacity shortage exists in the computing resource of the resource type in the distributed computing system.

5. The method of claim 1, further comprising:

in response to determining that the determined inventory level does not exceed a preset threshold, performing one or more of:

transmitting, via the computer network, an alert indication to an administrator of the distributed computing system;

triggering an expedited build-out of additional hosts configured to provide the computing resource of the resource type; or performing a risk assessment of service failure based on the inventory level and a service level agreement.

6. The method of claim 1 wherein:
the distributed computing system is an on-premise cloud computing system communicably coupled to a public cloud computing system; and
the method further comprises, in response to determining that the determined inventory level does not exceed a preset threshold,
determining whether a load associated with the computing resource of resource type is movable to the public cloud computing system; and
in response to determining that the load is movable to the public cloud computing system, shifting at least a portion of the load associated with the computing resource of resource type to the public cloud computing system.

7. The method of claim 1 wherein accessing the data includes:
requesting a fabric controller in the distributed computing system to allocate an instance of the computing resource; and
in response, receiving, from the fabric controller, the data representing the currently available capacity of the computing resource in the distributed computing system.

8. The method of claim 1, further comprising:
receiving, via the computing network, data representing one or more of service restrictions and indications of operation failures in the distributed computing system; and
wherein analyzing the received data representing the usage levels of the computing resource of the resource type further includes adjusting the determined inventory level based on the received data representing one or more of service restrictions and indications of operation failures in the distributed computing system before determining whether the determined inventory level exceeds the preset threshold.

9. The method of claim 1 wherein analyzing the received data representing the usage levels of the computing resource of the resource type further includes determining a quantity of capacity shortage by comparing the one or more future usage levels to the received data representing the currently available capacity of the computing resource in the distributed computing system.

10. A computing device for performing capacity management in a distributed computing system having multiple hosts interconnected by a computer network, the computing device comprising:
a processor; and
a memory operatively coupled to the processor, the memory containing instructions executable by the processor to cause the computing device to:
predict one or more future usage levels of a computing resource in the distributed computing system based on data representing historical usage levels of the computing resource;
derive an inventory level of the computing resource based on the predicted one or more future usage levels and data representing a currently available capacity of the computing resource in the distributed computing system;
determine whether the derived inventory level exceeds a preset threshold associated with a capacity shortage of the computing resource; and
in response to determining that the determined inventory level does not exceed a preset threshold, instruct one or more out-for-repair hosts that provide the computing resource to perform recovery before performing recovery of other out-for-repair hosts that provide other computing resources.

11. The computing device of claim 10 wherein to predict one or more future usage levels includes:
to generate a time series model according to the data representing the usage levels of the computing resource; and
based on the generated time series model, determine the inventory level according to the data representing the currently available capacity of the computing resource in the distributed computing system and the one or more future usage levels according to the generated model.

12. The computing device of claim 10 wherein to predict one or more future usage levels includes:
to generate multiple time series models according to the data representing the usage levels of the computing resource;
to determine whether any of the time series models contain one or more significant coefficients; and
in response to determining that none of the generated time series models contain one or more significant coefficients, select one of the time series models with fewest parameters for predicting the one or more future usage levels.

13. The computing device of claim 10 wherein to predict one or more future usage levels includes:
to generate multiple time series models according to the data representing the usage levels of the computing resource;
to determine whether any of the time series models contain one or more significant coefficients; and
in response to determining that one of the generated time series models contains one or more significant coefficients,
to determine whether an autocorrelation function of residuals of the one of the generated time series models and a partial autocorrelation function of the residuals of the one of the generated time series models are significant; and
in response to determining that none of the generated time series models have an autocorrelation function of residuals and a partial autocorrelation function of the residuals that are significant, select one of the time series models with fewest parameters for predicting the one or more future usage levels.

14. The computing device of claim 10 wherein to predict one or more future usage levels includes:
to generate multiple time series models according to the data representing the usage levels of the computing resource;
to determine whether any of the time series models contain one or more significant coefficients; and
in response to determining that one of the generated time series models contains one or more significant coefficients,
to determine whether an autocorrelation function of residuals of the one of the generated time series models and a partial autocorrelation function of the residuals of the one of the generated time series models are significant; and
in response to determining that the one of the generated time series models has an autocorrelation function of residuals and a partial autocorrelation function of the residuals that are significant, select the one of the time series models for predicting the one or more future usage levels.

15. The computing device of claim 10 wherein to predict one or more future usage levels includes:
   to generate multiple time series models according to the data representing the usage levels of the computing resource;
   to determine whether any of the time series models contain one or more significant coefficients; and
   in response to determining that multiple generated time series models contain one or more significant coefficients,
      to determine whether an autocorrelation function of residuals of each of the generated time series models and a partial autocorrelation function of the residuals of each of the generated time series models are significant; and
      in response to determining that the at least one of the generated time series models has an autocorrelation function of residuals and a partial autocorrelation function of the residuals that are significant, select the one of the multiple generated time series models with the lowest Akaike information criterion for predicting the one or more future usage levels.

16. A method of capacity management in a distributed computing system having one or more fabric controllers, cluster controllers, and hosts interconnected by a computer network, the method comprising:
   receiving, via the computing network, data representing usage levels of a computing resource of a resource type from the one or more fabric controllers and cluster controllers;
   predicting one or more future usage levels of a computing resource in the distributed computing system based on the received data representing historical usage levels of the computing resource;
   determining whether a currently available capacity of the computing resource in the distributed computing system is depleted beyond a threshold time period based on the one or more future usage levels; and
   in response to determining that the currently available capacity of the computing resource in the distributed computing system is depleted before the threshold time period, instructing one or more out-for-repair hosts that provide the computing resource to perform recovery before performing recovery of other out-for-repair hosts that provide other computing resources.

17. The method of claim 16 wherein predicting the one or more future usage levels includes:
   generating a time series model according to the received data representing the usage levels of the computing resource; and
   based on the generated time series model, calculating the one or more future usage levels according to the generated model.

18. The method of claim 16, further comprising:
   in response to determining that the currently available capacity of the computing resource in the distributed computing system is depleted before the threshold time period, performing one or more of:
      transmitting, via the computer network, an alert indication to an administrator of the distributed computing system;
      triggering an expedited build-out of additional hosts configured to provide the computing resource of the resource type; or
      performing a risk assessment of service failure based on the inventory level and a service level agreement.

19. The method of claim 16, further comprising:
   receiving, via the computing network, data representing one or more of service restrictions and indications of operation failures in the distributed computing system; and
   wherein predicting one or more future usage levels further includes adjusting the one or more future usage levels based on the received data representing one or more of service restrictions and indications of operation failures in the distributed computing system.

20. The method of claim 16, further comprising:
   in response to determining that the currently available capacity of the computing resource in the distributed computing system is depleted before the threshold time period, determining a quantity of capacity shortage by comparing the one or more future usage levels to the received data representing the currently available capacity of the computing resource in the distributed computing system.

* * * * *